United States Patent [19]

Taubenmann

[11] 4,300,776
[45] Nov. 17, 1981

[54] SEALING ASSEMBLY FOR TWO RELATIVELY MOVABLE MACHINE PARTS

[75] Inventor: Peter Taubenmann, Munich, Fed. Rep. of Germany

[73] Assignee: Krauss-Maffei Aktiengesellschaft, Munich, Fed. Rep. of Germany

[21] Appl. No.: 210,288

[22] Filed: Nov. 25, 1980

[30] Foreign Application Priority Data

Dec. 11, 1979 [DE] Fed. Rep. of Germany ....... 2949723

[51] Int. Cl.³ .......................... F16K 43/00; B67D 5/46
[52] U.S. Cl. .................................... 277/124; 277/161; 222/134
[58] Field of Search ............... 277/123, 124, 106, 114, 277/161, 102; 222/134, 334; 251/161

[56] References Cited

U.S. PATENT DOCUMENTS

| | | | |
|---|---|---|---|
| 2,188,957 | 2/1940 | Pfauser | 277/124 |
| 2,684,274 | 7/1954 | Saxon | 277/124 |
| 4,135,546 | 1/1979 | Morrison | 277/124 |
| 4,167,263 | 9/1979 | Cupedo | 251/161 |
| 4,211,345 | 7/1980 | Taubenmann | 222/134 |

Primary Examiner—Robert I. Smith
Attorney, Agent, or Firm—Karl F. Ross

[57] ABSTRACT

A packing for a piston-and-cylinder arrangement, especially for a dosing or metering unit for highly-filled reactive synthetic resin components such as a polyol or isocyanate, e.g. for producing polyurethanes, comprises a stack of yieldable rings of V-section with one member at an end of the stack bearing with a planar surface against a planar shoulder of the piston and the ring at the opposite end of the stack engaging a spring ring of V-section which confronts an abutment of the piston. According to the invention, the angle $\alpha$ between the two shanks of the V of the spring ring, in its unstressed state, is greater than the angle $\gamma$ between the flanks of the packing ring at this end of the stack which define the V of this packing ring. The arrangement is such that under stress the angle $\alpha$ can be reduced to a value less than the angle $\gamma$

7 Claims, 4 Drawing Figures

SEALING ASSEMBLY FOR TWO RELATIVELY MOVABLE MACHINE PARTS

FIELD OF THE INVENTION

My present invention relates to a packing arrangement between two relatively movable parts and, more particularly, to a sealing assembly which can be mounted upon a piston or upon a cylinder for sealing these two elements relative to one another even in the presence of highly abrasive materials. In its most specific form the invention relates to a piston packing for the dosing or metering device of a system handling highly-filled reactive systhetic resin components.

BACKGROUND OF THE INVENTION

While the art of sealing two relatively moving machine parts or elements against one another is highly developed, significant problems are still encountered when these elements are, for example, elements of a metering or dosing pump handling highly abrasive materials such as highly-filled reactive synthetic resin components.

For example, in my U.S. Pat. No. 4,211,345 issued July 8, 1980 on application Ser. No. 898,775 which was filed Apr. 21, 1978 as a continuation-in-part of Ser. No. 782,962 filed Mar. 30, 1979 (U.S. Pat. No. 4,167,263), commonly assigned with the present case, some of the problems encountered with highly-rilled fluids which must be displaced by a piston reciprocatable within a cylinder, have been described.

In general, in such systems, the packing is provided on the moving element which can be a piston and is customarily disposed between two relatively removable cylindrical surfaces, i.e. the cylindrical surfaces of the piston and the cylinder.

The packing can be a stack of sealing rings composed of flexible (i.e. compressible and even elastomeric) the rings having V-profiles or cross sections and being nested one in another. Usually the V is open in the direction of the main compartment containing the abrasive fluid so that pressure in this compartment tends to spread the V and increase the sealing action.

The piston may have an angular shoulder lying in a plane perpendicular to the axis and engaging a planar surface of the end ring of the stack turned toward this shoulder. The ring at the opposite end of the stack can confront another shoulder formed on the piston.

A seal of this type has been found to be especially effective for metering and dosing piston pumps, more generally handling machines, for reaction synthetic resin components such as polyols and isocyanates which can be highly charged with fillers, such as abrasive solids, as mentioned in U.S. Pat. No. 4,211,345. The fillers may be mineral pigments, glass fibers or any solid materials customarily utilized in polyurethanes or other reaction products to be formed by the reactive components. The operation of metering or dosing units and especially piston pumps for this purpose is fully described in U.S. Pat. No. 4,211,345 which corresponds to German Patent Document No. 27 36 177.

As pointed out in the latter patent, it is advantageous to provide means for bringing the two surfaces of the piston toward each other to compensate for wear of the packing.

While this packing system has been found to be highly effective, it has the disadvantage that, with constant operation, the friction between the packing ring and the cylinder wall increases to the point that, when the piston must be moved against an elevated pressure in one of the chambers of the cylinders, the displacement force cannot be effectively supplied in the usual way. When this force, e.g. from a fluid reservoir, must be increased to overcome both friction and a chamber pressure wear of the packing rings is sharply increased.

The reason for the increased difficulty or even impossibility of retracting the piston or effecting the return stroke thereof appears to be the penetration of gas, liquid and filler particles during the pressure or forward stroke into the region of the packing. As long as only liquid penetrates this region, the pressure relief in the compartment caused by the return stroke may be sufficient to draw the liquid in large measure out of the interstices of the packing. However, with materials of high viscosity, especially materials containing a high proportion of solid fillers, the return stroke of the piston may not suffice to allow the degree of expulsion of these materials which is essential to relieve the friction forces mentioned previously. During the next stroke the problem is multiplied and eventually the packing system must be disassembled and the packing replaced or cleaned, thereby interrupting the operation of the machine.

A similar problem arises when material is retained in the packing region and the substance which is to be handled by the metering pump is changed to a component capable of reacting with the original material. In this case, the retention of significant amounts of the original material may bring about a reaction with the new substance and hardening or setting of the reaction product in the region of the packing. In this case the packing-contaminating material cannot be removed and again disassembly and replacement may be required.

It has been found that, when all of the adjacent surfaces of the packing rings have the same angle, this difficulty is most pronounced since there is little tendency even on the return stroke for material which has penetrated into the packing assembly, to be expelled.

This results in a progressive and marked increase in the friction even on the return stroke and eventually requires maintenance operations of the type described.

A similar problem arises when the metering or dosing is utilized to handle fluids at different temperatures, e.g. fluids at temperatures different by 20° to 30° C. In this case, the temperature effect upon the sealing rings causes contraction of the sealing elements during operation in the cold phase and the medium penetrates into the space left free by the volumetric contraction. In the warm phase, the expansion of the sealing rings prevents this medium from being effectively expelled.

OBJECTS OF THE INVENTION

It is the principal object of the present invention to provide an improved sealing or packing assembly especially for machines or devices of the type described, which does not require frequent disassembly, cleaning or replacement of the packing.

Another object of the invention is to provide a packing assembly for a piston-and-cylinder arrangement, e.g. of a metering or dosing pump handling highly-filled reactive synthetic resin components, whereby the return stroke of the piston does not have to overcome extremely high friction forces arising from the trapping of the medium in the packing or which is capable of restricting the rate of increase of friction or drag resistance during the return stroke of the piston at least for long periods of time.

Yet another object of the invention is to provide a packing assembly for a machine of the character described which is of inexpensive construction, high sealing effectiveness and low maintenance.

SUMMARY OF THE INVENTION

These objects and others which will become apparent hereinafter are attained, in accordance with the present invention in a packing assembly for sealing two relatively moving elements, e.g. a piston element and a cylinder element, whereby one of these elements is provided with a shoulder remote from a chamber or compartment in which pressure is to be built up during a forward or pressurizing stroke, a packing ring stack engageable at one end with this shoulder and formed with rings of V-section opening toward the chamber, and another shoulder delimiting the stack at the end thereof turned toward this shoulder.

According to the invention, a spring element is provided between the sealing ring at the end of the stack proximal to the pressurizable chamber and the corresponding shoulder, this spring element having a V-section and outline dimensions substantially equal to those of the sealing rings, the V-section of the spring ring including an angle $\alpha$ in the unstressed state which is larger than the angle $\gamma$ of the flanks of the sealing ring juxtaposed with the spring ring and bearing thereon.

According to the invention, moreover, the spring ring is so mounted with respect to the shoulder as to permit reduction of the angle $\alpha$ to a value less than the value of the angle $\gamma$.

Because of a larger flank angle of the spring ring than the flank angle of the packing ring juxtaposed therewith and contacting the spring ring even at the inception of the pressure stroke a more effective sealing is obtained than without the spring ring, thereby limiting the amount of fluid medium which can penetrate the packing assembly. With increasing pressure, the spring ring resiliently deforms and presses with greater force upon the stack of sealing rings.

With time, during the pressure or forward stroke, the fluid medium penetrates into the packing region so that eventually the pressure in this region can equal the working pressure (up to 250 b).

During the return stroke, when a lower pressure is generated outside this region than within it, the spring element undergoes a resilient deformation to reduce its flank angle, thereby permitting escape of the medium in this region and reduction of the pressure therein.

It is this latter operation which is of vital importance to the present invention.

Since a limited free reduction in the flank angle of the spring ring is desired, the configuration of the counter-surface supporting the spring ring is important. It can have, for example, an I-section, with the ridge of the I-section member engaging the vertex of the V of the spring ring so that the flanks thereof cand bend toward one another. Alternatively and in a best mode embodiment of the invention, however, the counter-surface can have a V-profile with flanks or sides which intercept the edges of the spring ring remote from the vertex, after a limited reduction in the angle $\alpha$, thereby preventing overloading of the spring ring.

The sides of the counter-surface, therefore, can include a fixed angle $\beta$ which is smaller than the angle $\alpha$ of the spring ring in the relieved state thereof.

It has been found to be advantageous to form the counter-surface on a separate ring which can be mounted against the shoulder of the piston and can be provided adjacent the shoulder with a multiplicity of radial passages. This facilitates outflow of any medium in the packing region during the return stroke.

The spring ring can have the configuration of a dished-disk annual spring with frustoconical inner and outer portions joining at the vertex and defining inner and outer rims which, according to yet another feature of the invention, can have axially extending flanges which are coaxial with one another and reach toward the counter-ring.

According to yet another feature of the invention, the angle $\alpha$ between the flanks of the spring ring is about 120° in the relieved state thereof.

I have also found it to be highly advantageous to include similar spring ring, e.g. of metal, between at least two neighboring packing rings.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
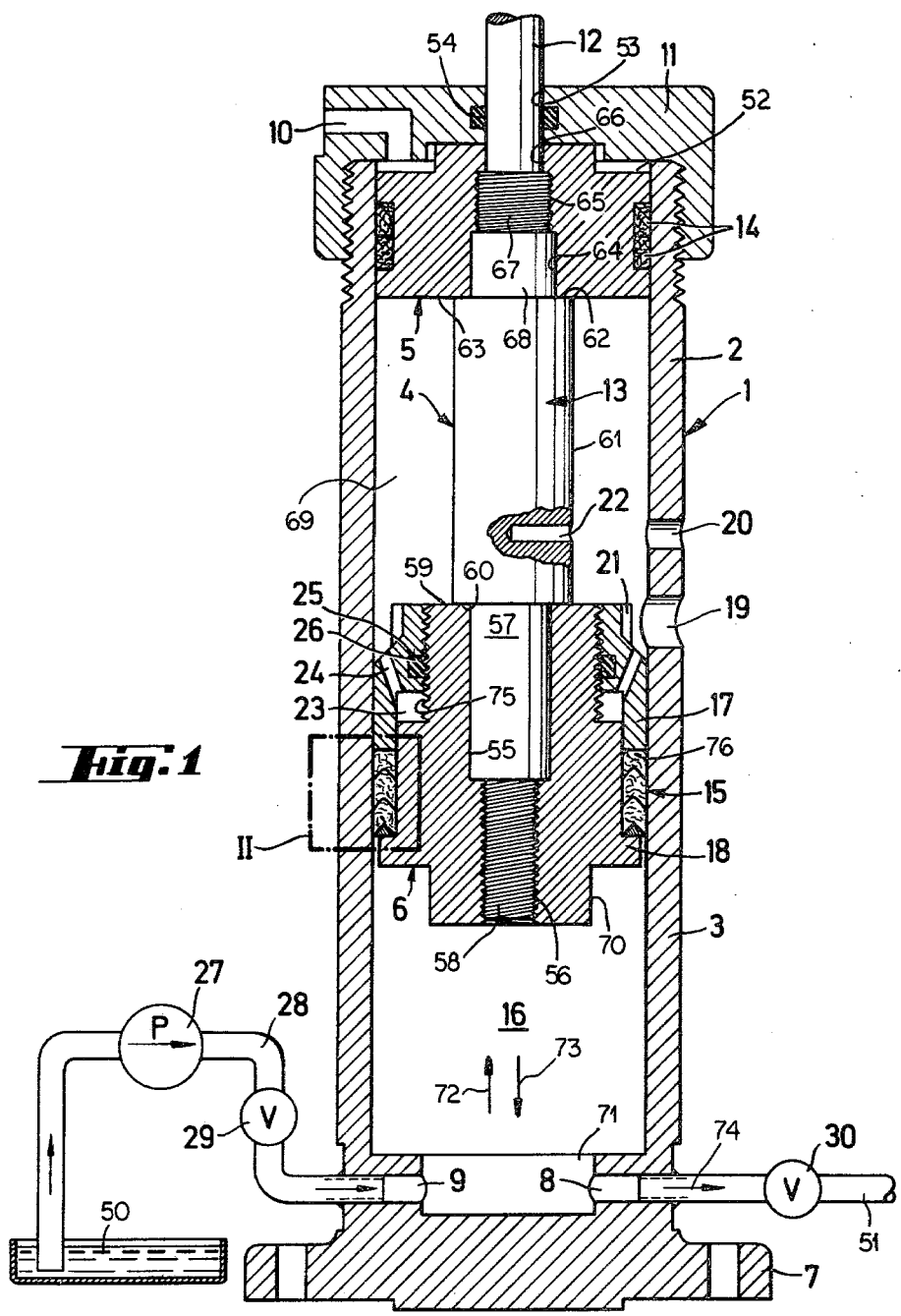
FIG. 1 is an axial cross-sectional view through a piston-and-cylinder arrangement forming a metering or dosing pump which can be used in the system of U.S. Pat. No. 4,211,345 but embodying the packing arrangement of the invention.

The piston-and-cylinder arrangement shown in FIG. 1 operates in the manner described in the last-mentioned patent comprises a cylinder 1 with a double piston 4 which is axially shiftable in the cylinder chamber 2. The piston comprises a drive portion 5 at its upper end and a displacement portion 6 forming the metering or dosing piston at its lower end which also defines the metering cylinder 3.

The cylinder portion 3 is connected to a flange 6 which can be bolted to a support and is formed with two radial bores 8 and 9.

The bore 9 forms an inlet for a highly-filled synthetic resin component which may be drawn from a reservoir 50 by a pump 27 which can be of the adjustable displacement type.

The pump 27 feeds this reactive component via line 28 and a valve 29 to the metering chamber 16 via the inlet 9.

The outlet 8, which also communicates with this metering chamber 16, is connected by a line 51 and a valve 30 to a mixing chamber opening into a mold cavity, the valving system operating as described in the latter patent.

To the upper end of the drive cylinder portion 2, there is threaded a cap 11 formed with a bore 10 through which a drive fluid is introduced into the compartment 52 above the piston 5.

The double piston 4 also comprises a control rod 12 which passes through an axial bore 53 of the cap 11, being sealed at 54.

The control rod 12 can form part of a connecting rod 13 which secures the two piston members 5 and 6 together.

More specifically, the metering member 6 is provided with a stepped bore 55, 56, the latter diameter portion 55 of which receives an unthreaded shank 57 of the connecting rod 13. The small diameter portion 56 is internally threaded and receives the threaded end 58 of rod 13 so that the upper end 59 of piston 6 abuts against a shoulder 60 of the central portion 61 of the connecting rod 13.

This central portion 61 serves as a spacer between the two piston members 5 and 6 and can be abutted at its shoulder 62 by the underside 63 of the piston member 5 which has a stepped bore 64, 65, 66.

The small diameter portion 66 of this bore passes the rod 12 while the intermediate diameter portion 65 is internally threaded and connected to the externally threaded portion 67 of the connecting rod 13. The large diameter portion 64 of this stepped bore accommodates an unthreaded section 68 of the connecting rod 13.

The space 69 between the pistons 5 and 6, therefore, serves to separate the normal drive fluid from the unusual medium to be metered by the apparatus of FIG. 1.

The piston member 6, which displaces the highly-filled reactive components, can have a central boss 70 which fits snugly into a cylindrical recess 71 at the base of the compartment 16 in the flange 7 and into which the bores 8 and 9 open.

The piston 6 is formed with the improved packing 15 of the present invention.

When the valve 30 is closed and valve 29 is open, the abrasive reactive fluid from pump 27 can be introduced into the compartment 16, the pistons being forced by the pressure of this fluid in the direction of arrow 72 by the pressure of this medium. Valve 29 is then closed and valve 30 is opened while a hydraulic fluid is supplied to passage 10, thereby displacing the pistons in the direction of arrow 73 and transferring a metered dose in the direction of arrow 74 through the outlet 8.

This packing 15 is subject to penetration by the abrasive reactive component and to wear. Hence the piston 6 is formed with an externally threaded boss 75 upon which a sleeve 17 can be screwed to form an annular shoulder 76 which can be adjustably spaced from an annular shoulder 18 on the piston 6.

The packing assembly is received between these shoulders and can be compressed therebetween, upon rotation of the sleeve 17, relative to the connecting rod 13 and the balance of piston 6.

Such adjustment can be affected upon a drop in sealing effectiveness without dismounting the pistons or disassembling the cylinder arrangement by inserting a dixing pin through an opening 20 in the cylinder to engage in a radial bore 22 of the connecting rod 13. A tool such as a chuck key or bar can be introduced via opening 19 in the cylinder wall to engage teeth 21 forming a crown gear upon the sleeve 17 to enable the same to be rotated by this tool relative to the connecting rod 13. The space 23 between the sleeve 17 and the remainder of the piston 6 is vented through bores 24 and the two parts are held against undesired relative rotation by a synthetic ring 26 bearing upon the thread of portion 75 and received in an inwardly open groove 25.

While only one bore 22 has been shown in the connecting rod 13, the latter can be provided with a number of such bores to facilitate alignment of one of them with the opening 20.

Figure 2:
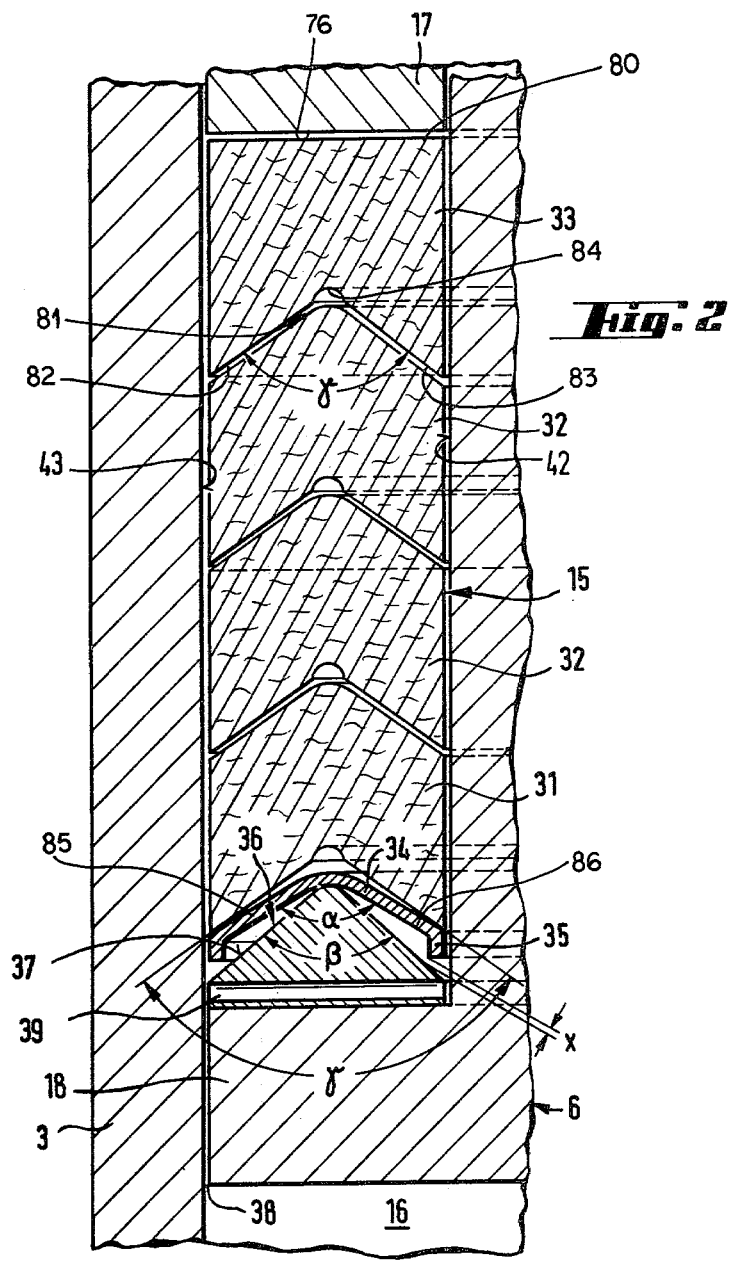
FIG. 2 is a detail view of the region shown at II of FIG. 1 with the spring element in its relieved state.
Figure 3:
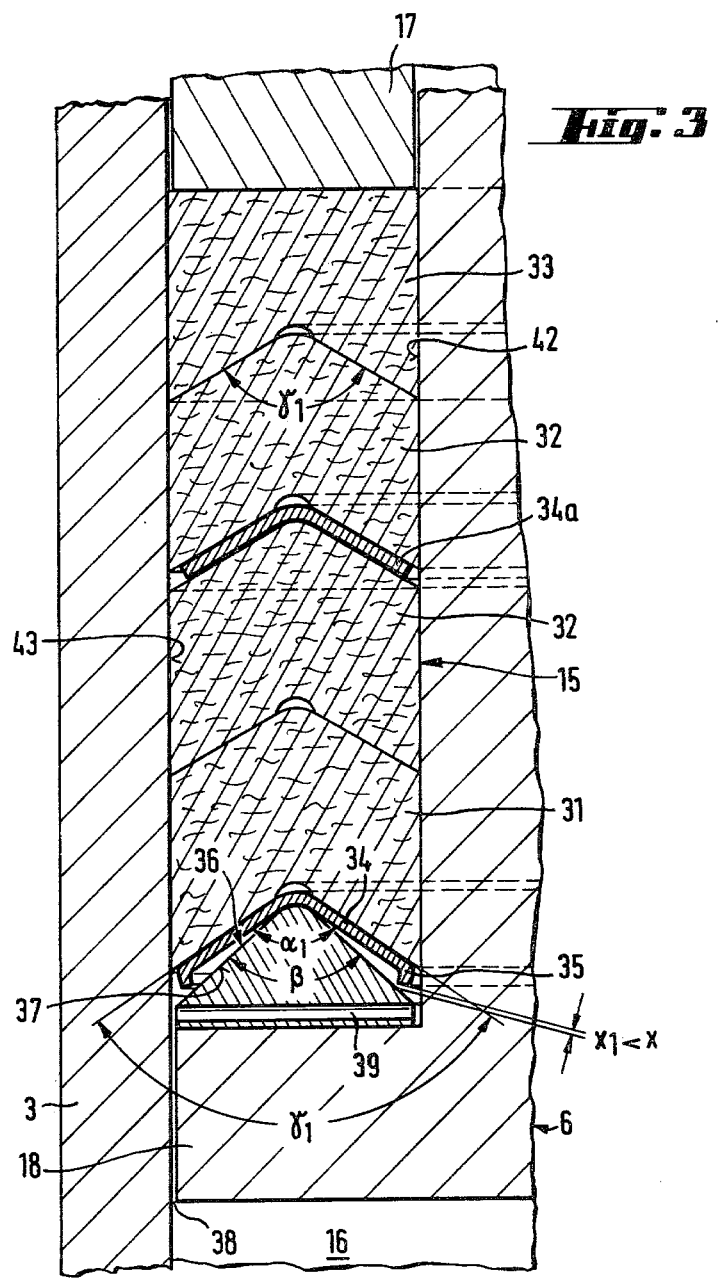
FIG. 3 is a view similar to FIG. 2 showing another embodiment of the invention shortly before the development of full pressure in the chamber below the piston.
Figure 4:
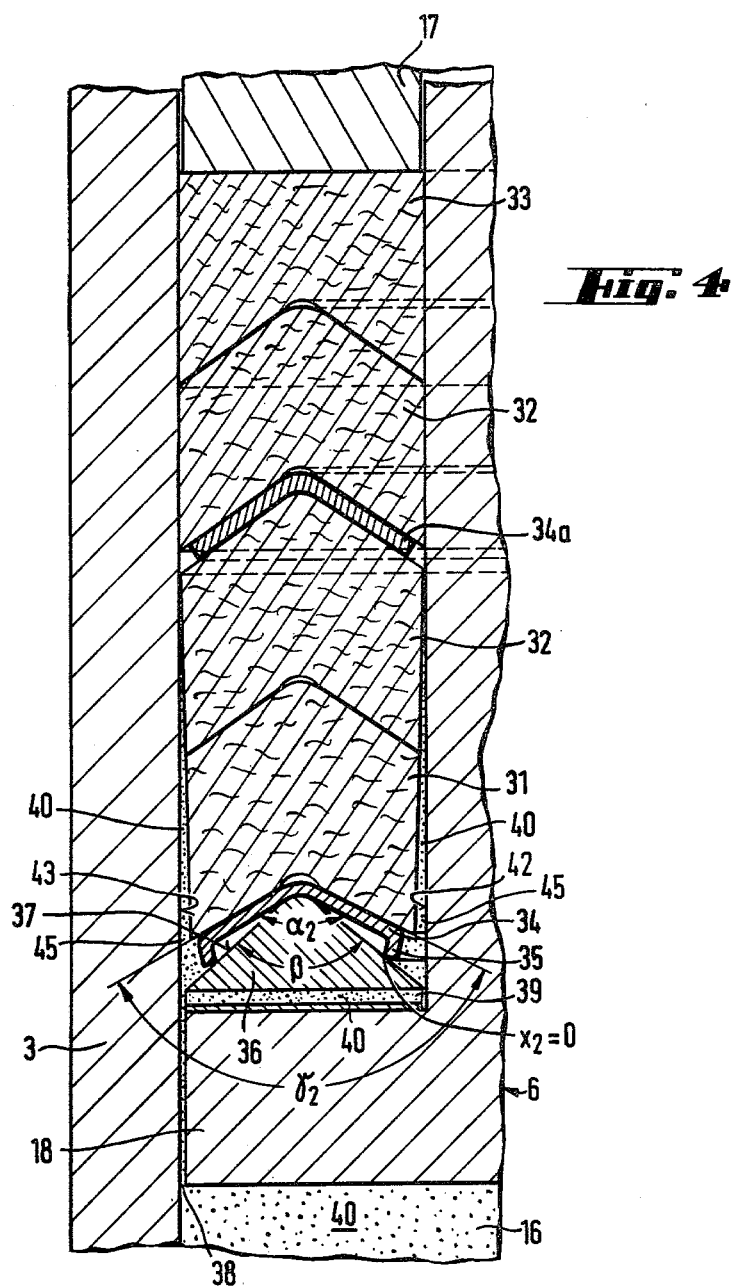
FIG. 4 is a view similar to FIG. 3 at a later stage in the operation.

The packing 15 can be of the type shown in FIG. 2 or of the type shown in FIGS. 3 and 4, the difference being the interposition of one or more metal spring rings 34a between pairs of packing rings 32, 33. While only one such additional spring ring has been shown in FIGS. 3 and 4, it should be noted that a ring of this type can be provided between each pair of packing rings 31, 32, and 32, 32 and 32, 33.

In both embodiments, therefore, the packing comprises a stack of sealing rings 31, 33, 33 of conventional shape and construction. These rings can be composed of cord-reinforced elastomeric (rubber closed material) or any other flexible packing material conventional in the art.

In the preferred and best mode embodiment of the invention, this stack of rings is received in a rectangular cross section chamber defined axially between the shoulder 17 and 18 and radially by the cylindrical walls of the cylinder and the piston. While, in this embodiment, the chamber is provided on the piston and is open outwardly, it is also possible to provide the sealing assembly on the cylinder in an inwardly open chamber of similar shape.

The upper sealing ring 33 at the end of the stack turned away from the mixing compartment 16 has a planar surface 80 confronting the surface 76 of the shoulder 17, and a V-shaped recess 81 formed by downwardly and outwardly diverging flanks 82 and 83, Each of these flanks is a frustocone in shape and the two flanks include an angle $\gamma$ between them. At the vertex formed between the two flanks, an undercut or groove 84 can be provided.

Into the recess 81 fits the V-shaped ridge of the next lower packing ring 32 whose underside is formed with a pair of outwardly diverging flanks of the type described receiving the crest of the next underlying ring 32 and so on to the ring 31 at the opposite end of the stack.

The latter ring does not receive another conventional packing ring of this sort, although it also has flanks diverging downwardly at the angle $\gamma$, but bears directly upon a V-section spring ring 34 which is supported upon a counter-bearing ring 36 whose flanks are shown at 37.

The spring ring 34 is formed along its internal and external edges or rims with axially extending flanges which are cylindrical and have been represented at 35 while the flanks 85 and 86 of the spring ring correspond to frustocones.

FIG. 2 shows the stack or packing rings 31–33, the spring ring 34 and the counter-bearing ring 35 loosely assembled between the shoulder 17 and 18 and hence in a relaxed state. The ends of the flanges 35 are spaced from the flanks 37 of the counter-bearing ring by distances x. In this relaxed or unstressed condition of the spring ring the angle $\alpha$ between the flanks 37 of the spring ring is greater than the angle $\gamma$ while the flank angle $\beta$ of ring 36 is smaller than the angle $\alpha$. Preferably the angle $\beta$ is also smaller than $\gamma$ so that the relationship $\alpha > \gamma > \beta$. Suitable dimensions for these angles are $\alpha = 120°$, $\gamma = 90°$, and $\beta = 60°$.

In the working position (FIG. 3), i.e. the clamping of the packing between the shoulders 17 and 18, the elements 31 through 33 are pressed downwardly and are uniformly spread outwardly by the spring ring 34 to bring the lower flanks of packing ring 31 to bear upon the full surfaces of the flanks of the spring ring 34 and effectively seal the piston against the cylinder wall.

Through an annular clearance 38 between the piston 6 and the cylinder portion 3, the reactive medium can encounter the sealing element 31 and increase the sealing effect. By adjustment of the position of sleeve 17 relative to the shoulder 18, the spacing x is reduced to x1 (FIG. 3) and the angle $\gamma$ between the flanks of the packing rings increases to $\gamma_1$ where $\gamma_1$ is greater than $\gamma$. The angle $\alpha$, however, is reduced to the valve $\alpha_1$ such that $\alpha_1$ is less than $\alpha$.

When the packing is effective in the displacement of the medium under pressure (FIG. 4), the medium 40 can penetrate through the annular gap 38 into the packing region between the packing rings 31 and 32 and the wall surfaces 42, 43 which presses the packing rings away from the walls 42, 43 to form a gap 45 which is permitted by the spring ring 34 until the flanges 35 engage the flanks 37($x_2=0$), thereby resiliently deforming element 34 additionally. The shanks angle of this spring then has its minimum value $\alpha_2$ and the spring ring a maximum resilient force. Flanks of the packing member 31 assume an angle $\gamma_2$ corresponding to the relationship $\alpha_2 < \alpha_1$ and $\alpha_2 = \gamma_2$.

The spring force thus arises during pressurization as the angle decreases from $\alpha$ to $\alpha_2$ and, during the retraction of the metering piston, this force becomes a restoring force returning the spring element to its $\alpha_1$ position. The medium 40 in the gaps between the surfaces 42, 43 and the elements 31, 32, thereby discharging this portion of the medium and allowing the packing rings again to directly engage the walls 42, 43.

I claim:

1. A packing assembly for sealing two relatively movable machine elements against one another as a first of said elements moves toward a fluid compartment under pressure in a forward direction and can be retracted in an opposite direction, said packing assembly comprising:

an abutment formed on one of said elements remote from said compartment;

a stack of packing members braced at one end against said abutment and having V-section portions turned toward said compartment and defined by flanks diverging at angle $\gamma$;

a spring element of V-shaped cross section engaging the flank of a member of said stack proximal to said compartment and having a flank angle $\alpha$; and a counter-surface supporting said spring element against said stack, said angle $\alpha$ being greater than the angle $\gamma$ in a relaxed condition of said spring element and said counter-surface being shaped to permit deflection of flanks of said spring element to reduce the flank angle thereof to a value less than $\gamma$ upon stressing of said stack.

2. The packing assembly defined in claim 1 wherein said one of said elements is a piston and the other of said elements is a cylinder receiving said piston (and preferably forming a metering pump for a highly-filled reactive synthetic resin component therewith), said piston being formed with an outwardly open annular compartment receiving said stack and having a first annular shoulder forming said abutment, a second annular shoulder supporting said counter-surface and means for axially displacing one of said shoulders toward the other of said shoulders to stress said stack against said spring element and said counter-surface, said members forming packing rings, said spring element forming a spring ring encircling said piston.

3. The packing assembly defined in claim 2 wherein said counter-surface is formed by a support ring braced against said second shoulder and having a V-shaped crest engaging said spring element and formed with a flank angle $\beta$, said flank angle $\beta$ being smaller than the angle $\gamma$.

4. The packing assembly defined in claim 3 wherein said support ring is formed adjacent said second shoulder with a plurality of radially extending passages.

5. The packing assembly defined in claim 3 wherein the angle $\alpha$ is about 120° in the relieved condition of said spring ring.

6. The packing assembly defined in claim 3 wherein said spring ring is formed with internal and external generally cylindrical flanges along inner and outer rims thereof.

7. The packing assembly defined in claim 2, claim 3, claim 5 or claim 6 wherein a V-section metal spring ring is provided between two of said members.

* * * * *